United States Patent [19]

Swenson

[11] 3,944,692
[45] Mar. 16, 1976

[54] PRESSURE SENSITIVE MATERIALS AND METHODS OF MAKING SAME

[75] Inventor: Starkie L. Swenson, Neenah, Wis.

[73] Assignee: Unisource Corporation, Philadelphia, Pa.

[22] Filed: Apr. 8, 1974

[21] Appl. No.: 458,658

Related U.S. Application Data

[63] Continuation of Ser. No. 212,046, Dec. 27, 1971, abandoned.

[52] U.S. Cl. .................. 428/40; 283/18; 428/180; 428/41; 428/198; 428/211
[51] Int. Cl.² ........................ B32B 3/28; B32B 3/30
[58] Field of Search ............ 161/119, 120, 122, 126, 161/128, 131, 406, 125, 406 T, 146; 283/18; 428/40, 180, 198, 211

[56] References Cited
UNITED STATES PATENTS

| 2,667,436 | 1/1954 | Goepfert et al. | 161/406 |
|---|---|---|---|
| 3,028,280 | 4/1962 | Hoffman | 161/128 |
| 3,166,186 | 1/1965 | Karn | 161/166 |
| 3,518,158 | 6/1970 | Hurst | 161/406 |
| 3,533,899 | 10/1970 | Kapral | 161/128 |
| 3,616,156 | 10/1971 | Scholl | 161/121 |

*Primary Examiner*—George F. Lesmes
*Assistant Examiner*—Paul J. Thibodeau
*Attorney, Agent, or Firm*—Brezina & Lund

[57] ABSTRACT

Pressure sensitive materials and methods of making same, wherein a layer of adhesive material is sandwiched between a printing paper sheet surface and a backing sheet surface which is preferably of high density and coated with an adhesive release agent, preferably a silicone material. The backing sheet is of undulating form with the size of the undulations being large enough to provide a high coefficient of friction with a finger engaged therewith and being small enough to minimize stretching thereof and to thereby facilitate removal and to provide substantially uniform support of the printing paper for letter press printing thereon without mottling. A barrier coating may be provided on the surface of the printing sheet which is engaged with the adhesive and a non-skid coating may be provided on the exposed surface of the backing sheet.

2 Claims, 6 Drawing Figures

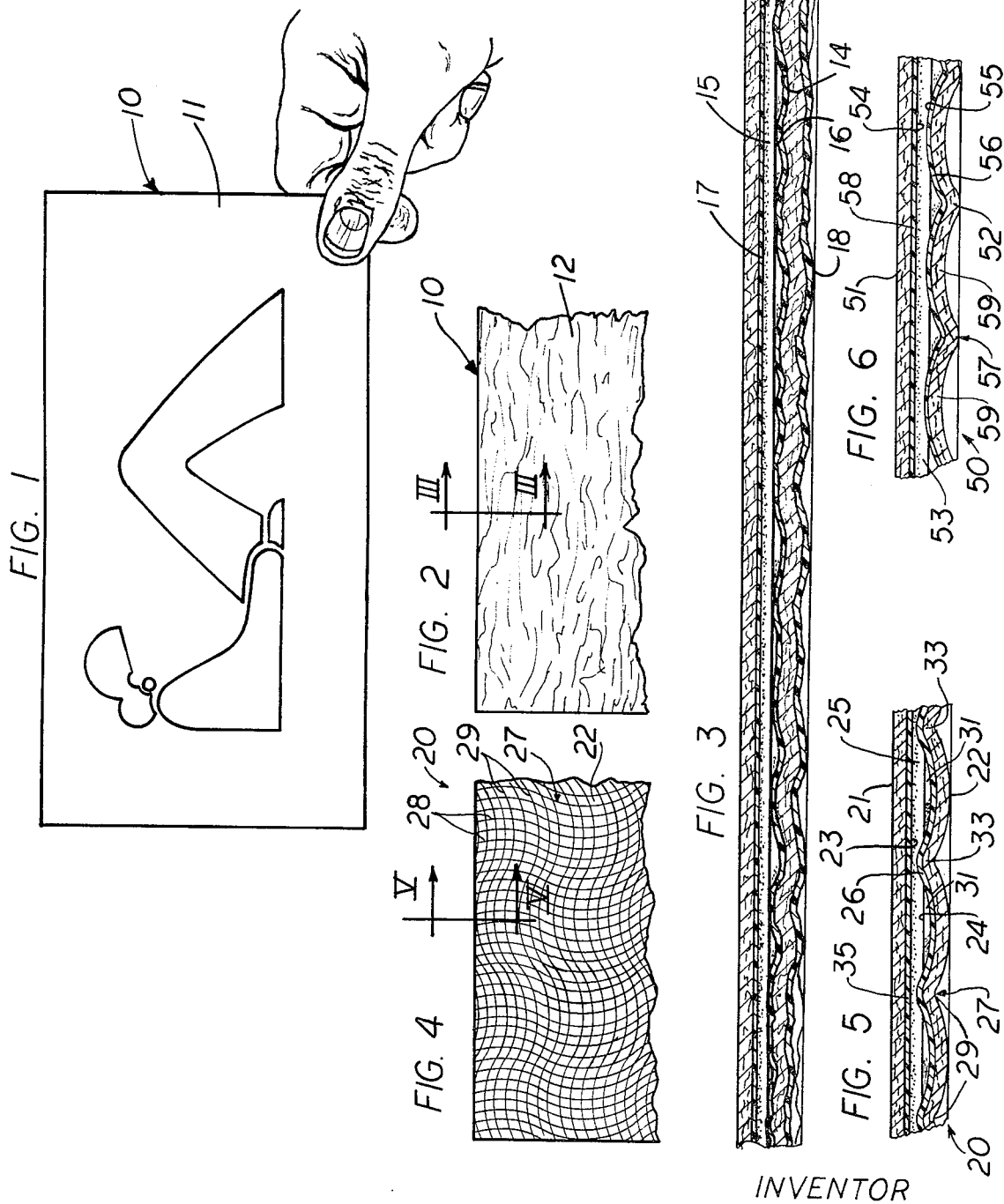

PRESSURE SENSITIVE MATERIALS AND METHODS OF MAKING SAME

This is a continuation of application Ser. No. 212,046 filed Dec. 27, 1971, now abandoned.

This invention relates to pressure sensitive materials and methods of making same and more particularly to pressure sensitive materials such as printed labels, provided with a backing sheet which is removable to permit adherence of the printed lable to a selected receiving surface. The pressure sensitive materials of the invention are economically manufacturable while permitting ready removal of the backing sheet, eliminating the oozing of adhesive from edges, eliminating curls and waviness and permitting letter press printing without any mottling effects. The materials are of minimum thickness and volume and are of uniform and consistent quality.

Pressure sensitive materials are known in the art in which an adhesive layer is sandwiched between a paper sheet and a backing sheet which is removable to permit pressing of the adhesive layer on a selected receiving surface. To permit removal of the backing sheet, various systems have been proposed. In one system, a mechanically manufactured slit or cut is provided at one or more places in the backing sheet. In another, there is an absence of adhesive along one or more edges. It has also been proposed to provide chemically etched lines at one or more places in the release sheet, either extending completely through the release sheet, or partially therethrough to weaken the sheet. A further proposal has been to provide a very stiff backing sheet such that bending pressure alone serves to break the bond between the adhesive and the backing sheet.

Another prior art system, described in the Kapral Pat. No. 3,533,899 involves the use of a silicone coated, polyolefin surfaced release backing paper, prepared with a high degree of mechanical crepe, such that convex bending of a label (backing facing outward) and with concurrent thumb pressure, will tend to stretch the backing, thereby loosening the backing from the adhesive. Additional finger or thumb pressure is then employed to seize the separated backing and pull it from the adhesive.

Such prior systems have objectionable features. The provision of slits, cuts or chemically etched lines is quite expensive as is also the provision of stiff backing paper or the silicone coated, polyolefin surfaced paper. The system in which there is an absence of adhesive along one or more edges of the paper requires that the paper be cut away in use and also means that each label must have a predetermined size during manufacture. The provision of a backing paper with a high degree of mechanical crepe is not altogether satisfactory in that the backing paper oftentimes fractures, releasing loose fibers and dust. In addition, satisfactory letter press printing is not possible, due to a mottling effect from the backing sheet. Also, with a high degree of mechanical crepe extreme variations in bulk an extremely non-uniform surface which causes an undesirable grossly uneven attachment.

This invention was evolved with the general object of overcoming the disadvantages of prior systems and of providing pressure sensitive materials and methods of making the same to obtain economy in manufacture along with excellent performance and consistent and high quality. A specific object is to provide pressure sensitive materials and methods of making the same by which a backing sheet can be readily and consistently removed while at the same time permitting letter press printing of the paper sheet.

In accordance with this invention, a layer of adhesive material is sandwiched between a printing paper sheet surface and a backing sheet surface coated with an adhesive release agent, preferably a silicone material which is relatively inexpensive. The backing sheet is of undulating form, the undulations being large enough to provide a high coefficient of friction when engaged by a finger while being small enough to minimize stretching thereof and to thereby facilitate removal and to provide substantially uniform support of the printing paper for letter press printing thereon without mottling. In one arrangement, the backing sheet is contracted to form the undulations, whereby the degree of contraction is substantially less than it is in the prior art system wherein the backing paper is prepared with a high degree of mechanical crepe. In another arrangement, the backing sheet is provided with a swirled waffle embossing to provide the highly desirable undulations. In both arrangements, preferably, the degree of stretchability is less than 10 per cent. With this relatively small degree of stretchability, the size of the undulations is also small, achieving the very important advantage of providing substantially uniform support of the paper for letter press printing thereon without mottling and also producing other important advantages. In particular, the undulations are uniform and consistent, and thus there is a minimum disruption and breakup of fiber in the backing sheet, obviating the release of loose fibers and dust into the adhesive. In addition, the overall thickness of the material is greatly reduced, correspondingly reducing the volume for a given quantity of the material.

Another specific feature is in the application of an amount of pressure in assembly sufficient to obtain engagement of the adhesive layer with from 40 to 60 per cent of the total area of the release agent coating on the backing sheet. With this feature, the backing sheet is securely held until removal is desired, which can be readily accomplished. This feature is also advantageous in decreasing exposure of the adhesive to air.

Another important feature and advantage relates to the use in the combination of an inexpensive silicone release agent. Such agents are, by themselves, known in the art, but in prior art systems, difficulties have been experienced in connection with removal of the backing sheet. In the material of this invention, it is possible to use the inexpensive silicone material while still obtaining the advantage of ready removability of the backer sheet and consistent and high quality.

Still another feature relates to the formation of at least one surface of the backing sheet with a high density to minimize absorption of the release agent.

A further important feature relates to the provision of a non-skid composition on the exposed surface of the backing sheet, further facilitating frictional engagement with the backing sheet and removal thereof.

This invention contemplates other objects, features and advantages which will become more apparent from the following detailed description taken in conjunction with the accompanying drawings which illustrate a preferred embodiment and in which:

FIG. 1 is a front plan view of a label of a pressure sensitive material according to the invention, also illustrating the placement of fingers for separation of a backing sheet;

FIG. 2 is a rear plan view of a portion of the label of FIG. 1;

FIG. 3 is a sectional view on a greatly enlarged scale, taken substantially along line III—III of FIG. 2;

FIG. 4 is a rear plan view of a portion of another label according to the invention;

FIG. 5 is a sectional view on a greatly enlarged scale, taken substantially along the line V—V of FIG. 4; and FIG. 6 is a greatly enlarged sectional view of a portion of still another label according to the invention.

Reference numeral 10 generally designates a label constructed from a pressure sensitive material formed in accordance with the principles of this invention. The illustrated label 10 includes a paper sheet 11 and a backing sheet 12 having facing surfaces 13 and 14 and an adhesive layer 15 sandwiched between the surfaces 13 and 14 with a coating 16 of an adhesive release agent on the surface of the backing sheet 12, engaged with the adhesive. In accordance with the invention, the backing sheet 12 is of contracted undulating form to facilitate manual removal thereof. As shown in FIG. 1, a corner portion of the label 10 may be held with the thumb and index fingers engaged with the sheets 11 and 12. The corner portion is then bent forwardly until it is disposed approximately at right angles to the remaining portion of the label 10, and with a light squeezing and sliding motion, the backing sheet 12 may be then separated from the adhesive. Thereafter, the backing sheet 12 can be peeled away from the adhesive layer 15 after which the sheet 11 may be pressed against a selected surface, to be adhered thereto by the adhesive layer 15. By bending the corner portion, the backing sheet 12 readily lifts up from the adhesive without the necessity of compressing or crushing the backing sheet, which crushing occurs when a heavy squeezing and sliding motion is performed without first bending the label. Moreover, with the construction of the label 10 according to the invention, laterally applied pressure, such as the pressure applied by rollers of a printing press, does not cause a separation of the backing sheet from the adhesive, since such a separation during printing would be unwanted and undesirable.

Also in accordance with the invention, the degree of contraction of the backing sheet and the size of the undulations are small enough to permit letter press printing of the sheet, substantially without any mottling effect, such as would result with a high contracted sheet of sharply creped configuration. It has been found that by proper proportioning of the degree of contraction, letter press printing is possible while at the same time, the backing sheet 12 can be readily removed. Preferably, the degree of contraction of the backing sheet 12 is less than 10 per cent and most preferably, it is in the range of from about 0 to 8 per cent.

It is found that the use of a restricted degree of contraction of the backing sheet has another important advantage in that the undulations of the sheet are relatively smooth and rounded, minimizing fracturing of fibers and the release of loose fibers and dust into the adhesive layer 15.

Another important feature is in the engagement of the adhesive layer 15 with a relatively large area of the coating 16, preferably with from 40 to 60 per cent of the total area of the coating 16. With this feature, the initial adhesive tack is substantially increased and the exposure of the adhesive to air is decreased. The attainment of the large contact area is facilitated by the use of the relatively small degree of contraction and size of the undulations. In making the material, the pressure applied to the sheets 11 and 12 is held within a certain range to obtain the required contact area. The required pressure range depends upon the particular materials used, the viscosity of the adhesive, temperature and curing relationship of the adhesive during its initial stages of manufacture. It is preferably optimized by adjustment until the desired area of contact is obtained in the output product.

The paper sheet 11 may be of a type of material which shows porosity to organic solvents contained in the adhesive layer 15 and in such cases, a suitable coating 17 is applied to the surface 13 to inhibit passage of the solvent into the paper. When the sheet 11 is of a type of material having a natural barrier resistance to the influx of solvents, the coating 17 may be eliminated.

The adhesive layer 15 is of any one of a number of commercially available latex or synthetic, self-sticking, pressure sensitive compounds. The adhesive may either be of a "permanent" type, i.e., one in which operates to so secure the sheet 11 to a surface as to prevent removal without destruction or of a "removable" type, i.e., one which permits clean removal, without damage, and reuse. The thickness of the layer 15 may preferably be in the range of from 0.0005 to 0.002 inches.

The coating 16 is preferably any one of a number of commercially available silicones in an aqueous or organic solvent solution. It is noted that with the invention, no polyolefin barrier film or other costly component is required.

At least the surface 14 of the backing sheet 12 is densified to minimize absorption of the release agent of the layer 16. A sheet of densified or calendered paper of kraft character is preferably employed to minimize such absorption as well as to reduce the likelihood of dust formation. The sheet 12 may be a creped or crinkled sheet having a thickness of from 0.003 to 0.010 inches. Sheets in the thirty to fifty pound range provide optimum handling but heavier stock may be used when the sheet 11 is in the form of an extremely light printing paper or film.

To further facilitate removal, a layer 18 of a commercially available non-skid compound may be applied to the outer surface of the backing sheet 12.

Referring now to FIGS. 4-6 of the drawings, there is shown a label 20 which is also constructed from a pressure sensitive material formed in accordance with the present invention. The label 20 is similar to the label 10, except that instead of being contracted, the backing sheet has a swirled waffle embossment to form the desirable undulations. The label 20 includes a paper sheet 21 and a backing sheet 22 with facing surfaces 23 and 24 and with an adhesive layer 25 sandwiched between the surfaces 23 and 24. A coating 26 of an adhesive release agent on the surface of the backing sheet 22 is engaged with the adhesive. In accordance with the present invention, an embossment 27 on the backing sheet 21 is configured in the shape of a swirled waffle pattern to provide evenly distributed undulations. The embossment 27 is applied to the back face of the backing sheet 22, and comprises a series of crossing longitudinally-extending grooves 28 and transversely-extending grooves 29 in the rear face of the backing sheet 22 to provide corresponding longitudinally-extending ridges 31 and transversely-extending ridges 33 on the front face of the backing sheet to engage the adhesive. Each one of the grooves is of a sinusoidal shape. The backing sheet 22 is embossed prior to securing it in place on the adhesive-backed printing sheet 21, and it is removed in the same manner as the backing sheet 12 is removed from the sheet 11 of the label 10.

With the construction of the label 20, uniform evenly-distributed undulations are provided, and thus the label 20 provides even greater resistance to laterally-applied pressures and enables ease of separation when a corner portion is bent over in accordance with the foregoing description of the method of removing the backing sheet. In the same manner as the label 10, the undulations of the label 20 are smooth and rounded to minimize fiber fracture, and the adhesive engages a relatively large area of the coating 26. In the case of the label 20, the adhesive engages approximately 40 to 50 per cent of the total area of the coating 26. All of the other foregoing advantages and features mentioned in connection with the label 10 apply equally to the label 20. For example, the size of the undulations of the backing sheet 22 are small enough to permit letter press printing without mottling the print.

A suitable coating 35 applied to the surface 23 inhibits passage into the paper sheet 21 of organic solvents contained in the adhesive, if the paper is of the type which is porous to such solvents. The surface 24, the adhesive layer 25 and the coating 26 are similar to the surface 14, the adhesive 15 and the coating 16 of the label 10, respectively.

Referring now to FIG. 6 of the drawings, there is shown a label 50, which is also constructed in accordance with the present invention, and which is identical to the label 20 except that the label 50 is assembled somewhat differently in that the reverse side of the embossed backing sheet of the label 50 engages the adhesive. The label 50 includes a paper sheet 51, a backing sheet 52 with an adhesive layer 53 disposed between opposed faces 54 and 55, an adhesive release coating 56 disposed on the surface of the backing sheet and engaged with the adhesive layer 53, and a solvent-inhibiting coating 58 disposed on the surface 54 engages the adhesive. A swirled waffle pattern embossment generally indicated at 57 on the backing sheet 52 is identical to the embossment 27 of the label 20, but the grooved side of the backing sheet 52 engages the adhesive. A plurality of protuberances 59 defined by the intersecting grooves of the embossment 57 engage the adhesive and provide uniformly-distributed undulations. The backing sheet 52 is removed in the same manner as the backing sheet 22 of the label 20, and in all other respects the label 50 is identical to the label 20 and all of the foregoing advantages and features of the label 20 apply equally to the label 50. With regard to the label 50, the adhesive layer 53 engages a somewhat greater percentage of the total area of the coating 56 as compared to the label 20.

Thus, in view of the foregoing description, it should now be apparent that the pressure sensitive material of this invention has a number of important advantages. As compared to the prior art types of construction in which a backing sheet is split, the material of this invention minimizes wastage and permits full use of the pressure sensitive sheet. It is not necessary to face cut the printing surface or provide the splits and the material is much more economically produced. The backing sheet is quickly and easily removed, adhesive ooze from the edge of the sheet and through backer splits is minimized or eliminated, ghost lines or lighter printing areas over splits are eliminated in the printing operation and curl and waviness due to splits are eliminated.

As compared to a prior art construction having a silicone coated, polyolefin surfaced and highly creped stock, the material of this invention is much less costly to produce, as a substantially increased initial tack and grab due to the increased contact area, and variability in the release force is minimized. The releasability factor can be relatively low, in the range of 30-40 grams, per lineal inch Keil PSTC standard Johnson & Johnson test method for example, and can be held constant within a relatively narrow range. The material is also substantially thinner and occupies much less volume. In addition, the formation of dust and loose fibers is minimized and because of the greater contact area there is a decrease in exposure of the adhesive to air, thereby minimizing aging effects. A very important additional advantage is that letter press printing is possible without any mottling effect.

It will be understood that modifications and variations may be effected without departing from the spirit and scope of the novel concepts of this invention.

I claim as my invention:

1. In a pressure sensitive material, a printing paper sheet and a backing sheet of fibrous material having coextensive facing surfaces, a layer of adhesive material sandwiched between said coextensive facing surfaces of said paper sheet and said backing sheet, and a coating of an adhesive release agent on the surface of said backing sheet engaged with said adhesive layer, said release agent providing a predetermined releasability factor, said backing sheet having uniformly distributed undulations therein of a predetermined size and in a swirled waffle pattern such that a predetermined percentage of the total area of said adhesive layer is in engagement with said coating with such engagement being uniformly distributed throughout said surface of said backing sheet, said undulations being smooth and rounded to facilitate letter press printing and to minimize fracturing of fibers of said backing sheet and release of loose fibers into said adhesive material, said backing sheet also having a predetermined degree of stretchability and being contracted to a predetermined degree in forming said smooth and rounded undulations, said predetermined releasability factor and said predetermined percentage being high enough and said predetermined size of said undulations, said predetermined degree of stretchability and said predetermined degree of contraction being low enough to substantially obviate relative movement of said printing paper sheet and said backing sheet during letter press printing and to permit accurate letter press printing of said printing paper sheet without mottling, said predetermined releasability factor and said predetermined percentage being also low enough and the size of said undulations, said predetermined degree of stretchability and said predetermined degree of contraction being large enough to permit ready removal of said backing sheet by engagement of the finger of a user therewith, said predetermined releasability factor being on the order of 30–40 grams per lineal inch on the Keil scale, said predetermined percentage being from 40 to 60%, said predetermined degree of stretchability being less than 10% and said degree of contraction being from 2 to 10%.

2. In a material as defined in claim 1, said printing paper and backing sheets being rectangular, and said swirled waffle pattern of said undulations being such that the portions of said backing sheet engaged with said adhesive layer are quadrinlinearly shaped and are separated by crossing ridge portions extending in angular non-parallel relation to the peripheral edge portions of said printing paper and backing sheets.

* * * * *